United States Patent

Gostin et al.

[19]

[11] Patent Number: 5,832,290
[45] Date of Patent: Nov. 3, 1998

[54] APPARATUS, SYSTEMS AND METHOD FOR IMPROVING MEMORY BANDWIDTH UTILIZATION IN VECTOR PROCESSING SYSTEMS

[75] Inventors: Gary B. Gostin; Matthew F. Barr; Ruth A. McGuffey, all of Plano; Russell L. Roan, Richardson, all of Tex.

[73] Assignee: Hewlett-Packard Co., Palo Alto, Calif.

[21] Appl. No.: 785,192

[22] Filed: Jan. 17, 1997

Related U.S. Application Data

[63] Continuation of Ser. No. 259,179, Jun. 13, 1994, abandoned.
[51] Int. Cl.[6] .................................................. G06F 12/00
[52] U.S. Cl. ..................... 395/800.05; 711/217; 711/219; 711/220
[58] Field of Search ............................... 365/236, 230.05; 711/217, 218, 219, 220; 395/800.04, 800.05, 800.06

[56] References Cited

U.S. PATENT DOCUMENTS

| | | | |
|---|---|---|---|
| 4,723,206 | 2/1988 | Kojima et al. ........................ | 364/200 |
| 4,852,049 | 7/1989 | Sakai ..................................... | 711/214 |
| 5,113,521 | 5/1992 | McKeen et al. ................... | 395/182.13 |
| 5,119,324 | 6/1992 | Ahsan ................................... | 364/736 |
| 5,168,573 | 12/1992 | Fossum et al. ....................... | 395/800 |
| 5,197,140 | 3/1993 | Balmer ................................. | 711/220 |
| 5,422,995 | 6/1995 | Aoki et al. ........................... | 345/515 |
| 5,452,425 | 9/1995 | Childers et al. ..................... | 395/588 |
| 5,467,459 | 11/1995 | Alexander et al. ................. | 395/480 |
| 5,471,597 | 11/1995 | Byers et al. ......................... | 711/215 |
| 5,481,687 | 1/1996 | Goubert et al. ..................... | 711/212 |

Primary Examiner—Jack A. Lane

[57] ABSTRACT

Vector register circuitry is provided which includes a vector register file comprising at least one vector register having a plurality of elements, the vector register file further having at least one data port and at least one address port for accessing selected ones of the elements of the vector register. Address generation circuitry is provided coupled to the address port and includes an adder having an output coupled to the address port, a first element register having an output coupled to a first input of the adder and an element counter having an output coupled to a second input of the adder.

15 Claims, 2 Drawing Sheets

FIG. 2A

| VECTOR REGISTER | ACCESS PATTERN |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | |
| 11 | |
| 12 | |
| 13 | |
| 14 | |
| 15 | |

VL=10
VF UNUSED
VM UNUSED

FIG. 2B

| VECTOR REGISTER | ACCESS PATTERN |
|---|---|
| 0 | |
| 1 | |
| 2 | |
| 3 | |
| 4 | |
| 5 | 0 |
| 6 | 1 |
| 7 | 2 |
| 8 | 3 |
| 9 | 4 |
| 10 | 5 |
| 11 | 6 |
| 12 | 7 |
| 13 | 8 |
| 14 | 9 |
| 15 | |

VL=10
VF=5
VM UNUSED

FIG. 2C

| VECTOR REGISTER | ACCESS PATTERN |
|---|---|
| 0 | |
| 1 | |
| 2 | |
| 3 | 0 |
| 4 | |
| 5 | 1 |
| 6 | |
| 7 | 2 |
| 8 | |
| 9 | 3 |
| 10 | |
| 11 | |
| 12 | |
| 13 | |
| 14 | |
| 15 | |

VL=8
VF=3
VM=0x0055h

APPARATUS, SYSTEMS AND METHOD FOR IMPROVING MEMORY BANDWIDTH UTILIZATION IN VECTOR PROCESSING SYSTEMS

CROSS REFERENCE TO RELATED APPLICATIONS

This is a continuation of application Ser. No. 08/259,179 filed on Jun. 13, 1994, now abandoned.

TECHNICAL FIELD OF THE INVENTION

The present invention relates in general to processing systems and in particular to apparatus systems and methods for improving memory bandwidth utilization in vector processing systems.

BACKGROUND OF THE INVENTION

A fundamental problem faced during the design of any computer system is determining how to transfer data from memory to the processor in a timely and efficient manner. Memory to processor data transfers are timely if the processor is never kept waiting for needed data from memory. Untimely transfers occur when the processor must wait for needed data, often because the request to memory for that data was not made far enough in advance to account for the access time of the memory (i.e. "memory latency"). Memory to processor data transfers are efficient if they support the maximum possible processing rate with the least amount of required memory bandwidth.

Vector processing systems operate on arrays of data (vectors) which can be pipelined through the memory system to reduce the latency problem on all but the first element of the vector. Notwithstanding, in vector computer systems, most of the processing is performed using vector arithmetic instructions which are dyadic (i.e. requiring two operand streams per operation performed by an arithmetic function unit), and thus the memory bandwidth requirements can become very large if a significant number of operand streams must be loaded from memory to support a substantial number of functional units.

Some vector computers move vectors directly between memory and the vector arithmetic function units within the vector processors. This approach places the highest bandwidth requirement on the memory system, with multiple paths to memory being required to support even one simple dyadic vector instruction. Most vector computers therefore provide some form of temporary vector storage area within the vector processor. This vector storage may be organized as a set of vector registers (a "vector register file"), or as a vector memory. When used, vector register files are typically the source for vectors sent to the vector arithmetic function units or to memory, and the destination for vectors loaded from memory or computed by the vector arithmetic function units. Vector register files are also frequently used to store intermediate results from the vector arithmetic units, eliminating the need to store such results in memory and making more efficient use of the memory bandwidth available.

Vector register files can be organized in a number of different ways. In the most commonly used organization, a vector register file is architecturally subdivided into a fixed number of vector registers, with each vector register containing a fixed number of elements. The number of elements in a vector register determines the maximum length of a vector that can be placed into the vector register (i.e., the maximum "vector length" or "$VL_{max}$"). A vector is written into a given vector register beginning at the first element and continuing for VL elements, where VL is the current vector length. Likewise, a vector is read from a given vector register, beginning at the first element and continuing for VL elements. Often the vector registers are physically grouped together within the register file into a number of vector register banks. In this case, each bank has some number of read ports, each available for providing a vector stream to an arithmetic function unit or memory, and some number of write ports, each available for receiving a vector stream from an arithmetic function unit or memory. The total number of vector streams that may be simultaneously provided to the arithmetic function units and memory equals the number of banks times the number of read ports per bank. Likewise, the total number of vector streams that may be simultaneously received from the arithmetic function units and memory equals the number of banks times the number of write ports per bank. Adding additional arithmetic function units to the system to provide higher performance may be supported by increasing the number of vector register file banks, ports, or both.

In systems using a vector memory, the vector memory also serves as the source and destination of all vector loads, stores and arithmetic computations. A vector memory, however, is not architecturally subdivided, but is maintained as a single addressable memory space. A vector may reside anywhere within the vector memory, with no requirement placed on starting element address, and with the vector length being limited only by the size of the memory. The starting element and vector length of each vector is most often specified by software.

The vector register file approach advantageously allows multiple function units to be supported by several small vector register banks each having only a few ports. This approach requires much less hardware to implement than a single large vector memory having many ports. Furthermore, each bank may be implemented independently from the other banks, since vectors may never cross from one register into another. Notwithstanding these advantages, vector registers traditionally may only be accessed beginning at the first element. Thus, if a vector required for an arithmetic operation is contained in a vector register, but does not begin at the first element of the vector register, it must be re-loaded from memory, thereby unnecessarily increasing memory bandwidth requirements. The vector memory approach avoids this disadvantage, but at the cost of significant hardware.

Thus, the need has arisen for apparatus, systems and methods for improving memory bandwidth utilization in vector processing systems. In particular, such apparatus, systems and methods should allow for the access to a vector or an element of a vector within a vector register without regard for the location of such vector or element within the register. In providing this advantage, such apparatus, systems and methods should use a minimum of hardware.

SUMMARY OF THE INVENTION

The principles of the present invention are preferably embodied in apparatus, systems and methods for improving memory bandwidth utilization in vector processing systems. Advantageously, such apparatus, systems and methods retain the implementation advantages of vector register files while supporting the flexible element addressing abilities of vector memories. In general, a vector register file is provided along with means for specifying the vector length of an operation. Means are provided for selecting the first element of a selected vector register to participate in an operation, such element either being the very first element in the vector register or another element. This selection may be performed independently for all source vectors, which are read from the vector register file, and for all destination vectors, which are written to the vector register file. Means are further provided for specifying a bit mask, which enables (if bit set) or disables (if bit cleared) access to corresponding elements of a vector participating in an operation.

According to a first embodiment of the present invention, vector register circuitry is provided which includes a vector register file comprising at least one vector register having a plurality of elements. The register file includes at least one data port and at least one address port for accessing elements of the vector register. Address generation circuitry is coupled to the address port which includes an adder having an output coupled to the address port, a first element register having an output coupled to a first input of said adder, and an element counter having an output coupled to a second input of the adder.

According to a second embodiment of the present invention, vector register circuitry is provided which includes a vector register comprising a plurality of elements and associated with at least one data port and at least one address port for accessing selected ones of the elements. Address generation circuitry is also provided which includes a register for holding a value representing a first element to be accessed, a counter incrementing in response to a clock signal, and an adder coupled to the address port for adding the value held in the element register with counts from the counter to generate a sequence of addresses corresponding to the selected elements.

According to a third embodiment of the present invention, vector register circuitry is provided which includes a vector register file comprising a plurality of vector registers, each vector register having a plurality of elements, said register file having at least one write data port and an associated write address port for writing data into selected ones of the elements, and at least one read data port and an associated read address port for reading data from selected ones of the elements. Processing circuitry is coupled to the read data port and the write data port. Write address generation circuitry is provided coupled to the write address port and includes a first element register for holding a value representing a first element to be written to, a counter incrementing in response to a clock signal, and an adder for adding the value held in the first element register with a count from the counter to generate at least one address corresponding to at least one element to be written through the write port. Read address generation circuitry is provided coupled to the read address port and includes a first element register for holding a value representing a first element to be read from, a counter incrementing in response to a clock signal, and an adder for adding the value held in the first element register with a count from the counter to generate at least one address corresponding to at least one element to be read through the read port.

A fourth embodiment of the present invention comprises circuitry for improving memory bandwidth utilization in a vector processing system. A vector register is provided comprising a plurality of elements and associated with at least one data port and at least one address port for accessing selected ones of the elements. Circuitry is coupled to the address port for generating addresses to selected ones of the elements and includes circuitry for holding a value representing a first element to be accessed, circuitry for generating a sequence of signals, and circuitry for combining the value held in circuitry for holding with each of the sequence of signals generated by the circuitry for generating a sequence of signals to produce a sequence of addresses addressing the selected ones of the elements.

The principles of the present invention are also embodied in a method for improving memory bandwidth utilization in a vector processing system including a vector register having a plurality of elements and at least one data port and at least one associated address port for accessing selected ones of the elements. The method includes the steps of presenting an address to the address port to enable access to corresponding ones of the register elements through the data port. The step of presenting includes the substeps of storing a value representing a first element to be accessed, generating a sequence of signals, and combining the value representing the first register element to be accessed with each of the generated sequence of signals to generate a sequence of addresses addressing the selected ones of the register elements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a–2c are diagrammatic representations of vector registers of an exemplary length, typical of those found in the vector register file of FIG. 1, demonstrating the operation the vector register circuitry of FIG. 1.

DETAILED DESCRIPTION OF THE INVENTION

Figure 1:
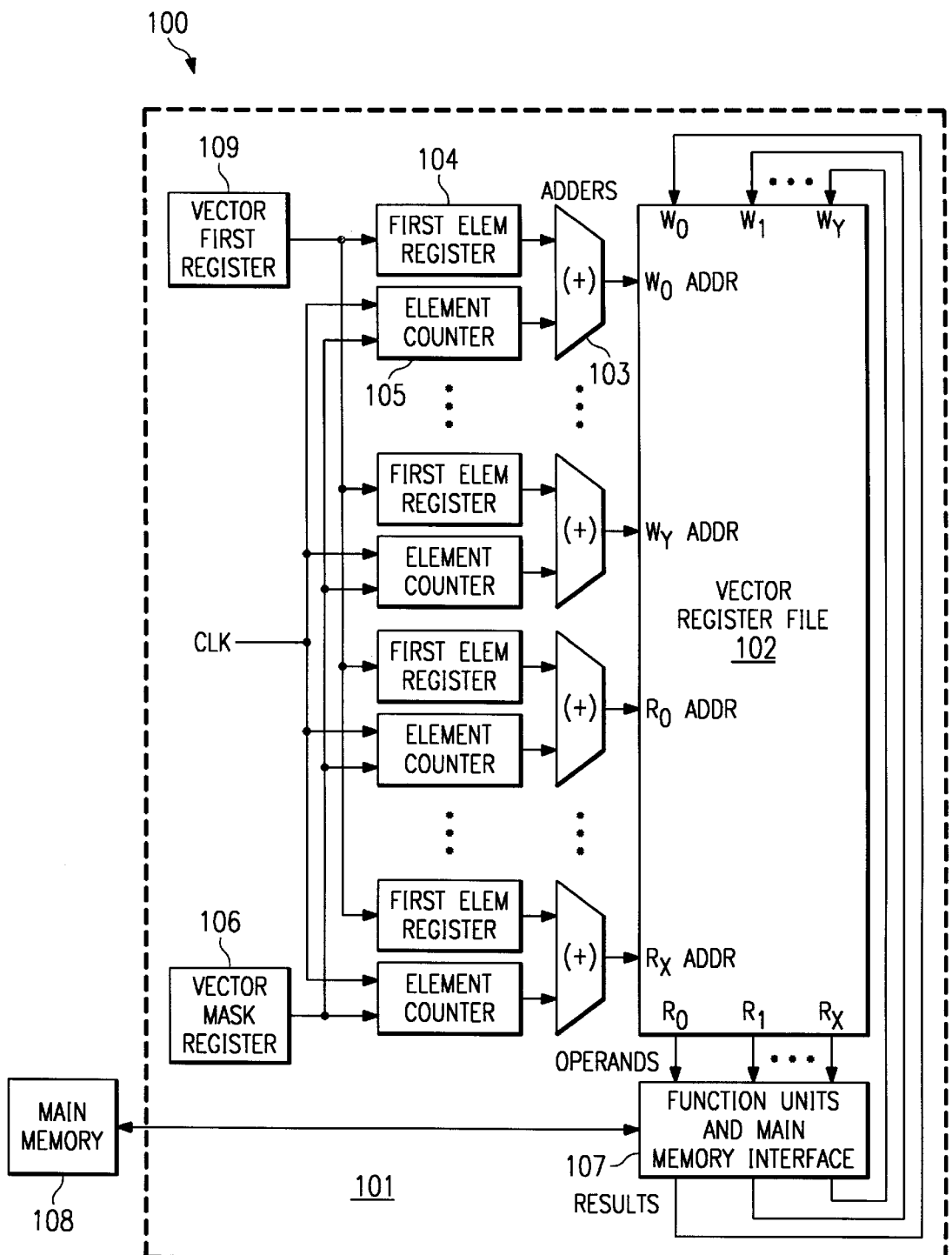
FIG. 1 is a functional block diagram of a portion of a data processing system including vector register circuitry according to the principles of the present invention.

FIG. 1 is a functional block diagram of a portion of a data processing system including vector register circuitry 100 embodying the principles of the present invention. In the preferred embodiment, circuitry 100 is disposed within a vector processor generally shown by dashed lines at 101.

Vector register circuitry 100 includes a vector register file 102 having a plurality of read data ports $R_o$–$R_x$ for outputting data and a plurality of write data ports $W_o$–$W_y$ for inputting data. Each write data port $W_o$–$W_y$ is associated with a write address port $W_o$–$W_y$ Addr and each read data port $R_o$–$R_x$ is associated with a read address port $R_o$–$R_x$ Addr. The number, size and organization of the registers in vector register file 102 will vary from application to application; in the preferred embodiment, vector register file 102 comprises four banks each having 512 64-bit registers (elements) partitioned into four vector registers of 128 registers each, with each bank coupled to three read ports and one write port. Basic logic circuitry such as gates, decoders and multiplexers within vector register file 102 select the proper vector register and elements in accordance with the addresses received at the corresponding address port.

Each read address port $R_o$–$R_x$ Addr and each write address port $W_o$–$W_y$ Addr is coupled to the output of a corresponding adder 103. Each adder 103 includes one input coupled to the output of a corresponding first element register 104 and a second input coupled to the output of a corresponding element counter 105. The input of each first element register 104 is coupled to a vector first register 109. The input of each element counter 105 is coupled to a vector mask register 106.

Vector first register 109 holds a value identifying the first element of a selected vector register to participate in an operation (the "vector first element" or "VF"). Vector mask register 106 holds a "vector mask" or "VM" of at least as many bits as the number of elements in a given vector register. Element counters 105 count in response to a received clock signal CLK.

Processing circuitry 107 is coupled to write data ports $W_o$–$W_y$ and read data ports $R_o$–$R_x$ of vector register file 102. Processing circuitry 107 includes one or more functional units for performing arithmetic, logical and other desired processing operations. Typically, the functional units receive operands from the read data ports $R_o$–$R_x$ and send results to the write ports $W_o$–$W_y$. Processing circuitry 107 also includes a main memory interface for the exchanging of operands and results between vector register file 102 with a main memory 108.

The operation of the illustrated embodiment can be best described in conjunction with FIG. 2. For purposes of illustration it is assumed that: each vector register has a length of 16 elements; the vector mask VM (when used) set in vector mask register 106 is 16 bits; and that VM (when used) is applied beginning at the first element being accessed as selected by the VF value (i.e. VM bit 0 enables/disables element VF, VM bit 1 enables/disables element VF+1, and so on).

To access (read from or write to) vector register file 102, a port is selected (either a read port or a write port as required) which provides access to a selected vector register within the register file. To start the access at a vector element in the selected vector register other than the very first element (as in the cases depicted in FIGS. 2b and 2c), a value for VF, set into vector first register 109, is transferred to the first element register 104 corresponding to the address port associated with selected data (read or write) port. The value for VF is held in this first element register 104 until all elements of the vector have been accessed such that the value in vector first register 109 can be modified without affecting vector accesses already in progress. If the access is to begin at the very first element in the selected vector register (as in the case depicted in FIG. 2a), the corresponding first element register 104 is cleared.

When no masking is required (as in the examples shown in FIGS. 2a and 2b where the vector register is accessed as a continuous sequence) the value of VF loaded into the given first element register 104 is added by the corresponding adder 103 with the initial value loaded into the corresponding element counter 105 (which in the preferred embodiment is equal to zero) to generate the address for the first element to be accessed. The counter is then incremented with each period of clock CLK and the resulting sequence of counts added to the value in first element register 104 to generate a sequence of elements to access the entire vector. The incrementing is enabled until the vector length VL has been reached.

To access a non-continuous pattern of elements in the selected vector register (such as depicted in FIG. 2c), the vector mask VM in vector mask register 106 is transferred in its entirety to the corresponding element counter 105. In the preferred embodiment, the given element counter 105 steps through only those counts that correspond to bits set to a logical "1" in the vector mask. This sequence of counts is added to the first element register to generate the sequence of element addresses for accessing a pattern of vector registers.

Although the present invention and its advantages have been described in detail, it should be understood that various changes, substitutions and alterations can be made herein without departing from the spirit and scope of the invention as defined by the appended claims.

What is claimed is:

1. Vector register circuitry comprising:
   a vector register file comprising at least one vector register having a plurality of elements, said register file having at least one data port and at least one address port for accessing selected ones of said elements of said vector register; and
   address generation circuitry coupled to said at least one address port comprising:
      an adder having an output coupled to said address port;
      a first element register having an output coupled to a first input of said adder;
      an element counter having an output coupled to a second input of said adder; and
      a vector mask register having an output directly connected to an input of said element counter.

2. The circuitry of claim 1 and further comprising a vector first register having an output coupled to said first element register.

3. The circuitry of claim 1 wherein said data port comprises a write data port.

4. The circuitry of claim 1 wherein said data port comprises a read data port.

5. Vector register circuitry comprising:
   a vector register comprising a plurality of elements and associated with at least one data port and at least one address port for accessing selected ones of said elements; and
   address generation circuitry comprising:
      an element register for holding a value representing a first said element to be accessed;
      a counter incrementing in response to a clock signal;
      a mask register for holding a mask, said mask directly presented to said counter such that said counter increments through a noncontinuous sequence of counts; and
      an adder coupled to said address port for adding said value held in said element register with count from said counter to generate sequence of addresses corresponding to said selected ones of said elements.

6. The circuitry of claim 5 and further comprising a vector first register coupled to said element register, said value transferred from said vector first register to said element register prior to the generation of a first said address.

7. The circuitry of claim 5 wherein said vector register is one of a plurality of vector registers disposed within a vector register file.

8. The circuitry of claim 5 wherein said data port comprises a read data port for reading data from said selected ones of said elements.

9. The circuitry of claim 5 wherein said data port comprises a write data port for writing data to said selected ones of said elements.

10. Vector register circuitry comprising:
   a vector register file comprising a plurality of vector registers, each said vector register having a plurality of elements, said register file having at least one write data port and an associated write address port for writing data into selected ones of said elements and at least one read data port and an associated read address port for reading data from selected ones of said elements;
   processing circuitry coupled to said read data port and said write data port;
   write address generation circuitry coupled to said write address port comprising:
      a first element register for holding a value representing a first said element to be written to;
      a counter incrementing in response to a clock signal;
      a mask register for holding a mask, said mask directly presented to said counter such that said counter increments through a noncontinuous sequence of counts; and
      an adder for adding said value held in said first element register with a count from said counter to generate at least one address corresponding to at least one said element to be written to through said address port; and read address generation circuitry coupled to said read address port comprising:
      a first element register for holding a value representing a first said element to be accessed;
      a counter incrementing in response to a clock signal;
      a mask register for holding a mask, said mask directly presented to said counter such that said counter increments through a noncontinuous sequence of counts; and
      an adder for adding said value held in said first element register with a count from said counter to generate at least one address corresponding to at least one said element to be read from through said at least one address port.

11. The circuitry of claim 10 wherein said processing circuitry comprises functional circuitry operable to perform arithmetic and logic operations.

12. The circuitry of claim 11 wherein said processing circuitry receives operands from said at least one read data port and sends results to said at least one write data port.

13. The circuitry of claim 12 wherein said processing circuitry includes interface circuitry for exchanging operands and results with an associated main memory.

14. The circuitry of claim 10 wherein said vector register circuitry forms a portion of a vector processor.

15. The circuitry of claim 10 wherein said vector registers of said vector register files are organized as a plurality of banks of vector registers, each said bank associated with at least one said read port and at least one said write port.

* * * * *

UNITED STATES PATENT AND TRADEMARK OFFICE
CERTIFICATE OF CORRECTION

PATENT NO.   : 5,832,290
DATED        : November 3, 1998
INVENTOR(S)  : Gary B. Gostin et al.

It is certified that error appears in the above-identified patent and that said Letters Patent is hereby corrected as shown below:

Column 4,
Line 46, delete "the operation of" and insert therefor -- the operation of the --

Column 5,
Line 13, delete "counter 105" and insert therefor -- counter 104 --

Column 6,
Line 55, delete "with count" and insert therefor -- with counts --
Line 56, delete "generate sequence" and insert therefor -- generate a sequence --

Signed and Sealed this

Eleventh Day of June, 2002

Attest:

Attesting Officer

JAMES E. ROGAN
Director of the United States Patent and Trademark Office